(12) United States Patent
Hirata et al.

(10) Patent No.: US 9,544,555 B2
(45) Date of Patent: Jan. 10, 2017

(54) PROJECTION-TYPE VIDEO-IMAGE-DISPLAYING DEVICE

(71) Applicant: HITACHI MAXELL, LTD., Osaka (JP)

(72) Inventors: Koji Hirata, Osaka (JP); Nobuyuki Kimura, Osaka (JP); Yuriko Inadachi, Osaka (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 14/646,335

(22) PCT Filed: Nov. 18, 2013

(86) PCT No.: PCT/JP2013/081071
§ 371 (c)(1),
(2) Date: May 20, 2015

(87) PCT Pub. No.: WO2014/080869
PCT Pub. Date: May 30, 2014

(65) Prior Publication Data
US 2015/0296190 A1  Oct. 15, 2015

(30) Foreign Application Priority Data
Nov. 20, 2012  (JP) .................... 2012-253909

(51) Int. Cl.
G03B 21/14  (2006.01)
H04N 9/31  (2006.01)
G02B 26/00  (2006.01)
(Continued)

(52) U.S. Cl.
CPC ......... H04N 9/3114 (2013.01); G02B 19/0047 (2013.01); G02B 26/008 (2013.01);
(Continued)

(58) Field of Classification Search
CPC .................... H04N 9/3114; G02B 26/008
See application file for complete search history.

(56) References Cited

U.S. PATENT DOCUMENTS 6,597,409 B1  7/2003  Shioya et al.
7,006,310 B2 *  2/2006  Karube ............... G02B 26/008
                                              348/743

(Continued)

FOREIGN PATENT DOCUMENTS

JP  2000-284361 A  10/2000
JP  2002-131687 A  5/2002
(Continued)

OTHER PUBLICATIONS

Partial European Search Report dated Jun. 2, 2016 for Appln. No. 13856379.6.

*Primary Examiner* — William C Dowling
(74) *Attorney, Agent, or Firm* — Volpe and Koenig, P.C.

(57)  ABSTRACT

A projection-type video-image-displaying device efficiently displays an image by reducing the loss of light in the device. The device is provided with a light source radiating white light, a rod lens, a rotary color filter, a DMD, illumination optical elements, a projection lens and a control device. The rod lens collects light from the light source and emits the light. The rotary color filter selectively transmits, from the white light, light of a specific color. The DMD modulates incident light in accordance with an image signal, and the illumination optical elements form illumination light for projection onto the DMD. The projection lens projects an image formed using the DMD. The control device synchronizes the rotary color filter with the image displayed by the DMD. The DMD is disposed in a substantially conjugate relationship with the light-emitting surface on the rotary color filter.

5 Claims, 5 Drawing Sheets

(51) Int. Cl.
*G02B 27/12* (2006.01)
*G03B 21/00* (2006.01)
*G03B 21/20* (2006.01)
*G03B 33/08* (2006.01)
*G02B 27/10* (2006.01)
*G02B 19/00* (2006.01)

(52) U.S. Cl.
CPC ....... *G02B 27/1033* (2013.01); *G02B 27/126* (2013.01); *G03B 21/008* (2013.01); *G03B 21/208* (2013.01); *G03B 33/08* (2013.01); *H04N 9/3152* (2013.01); *H04N 9/3182* (2013.01); *G02B 19/0019* (2013.01)

(56) References Cited

U.S. PATENT DOCUMENTS

| | | | |
|---|---|---|---|
| 7,837,337 B2* | 11/2010 | Liu | G03B 21/008 353/31 |
| 7,850,315 B2* | 12/2010 | Lin | G03B 21/28 353/84 |
| 2002/0145707 A1 | 10/2002 | Yoneyama | |
| 2005/0046981 A1 | 3/2005 | Karube et al. | |
| 2006/0176452 A1 | 8/2006 | Kim et al. | |
| 2007/0200955 A1 | 8/2007 | Harada et al. | |
| 2009/0040395 A1 | 2/2009 | Yoshida | |
| 2009/0244494 A1* | 10/2009 | Wada | G02B 26/008 353/84 |
| 2010/0328614 A1 | 12/2010 | Ikeda et al. | |

FOREIGN PATENT DOCUMENTS

| | | |
|---|---|---|
| JP | 2003149597 A | 5/2003 |
| JP | 2005-70371 A | 3/2005 |
| JP | 2002-277820 A | 9/2005 |
| JP | 2009031567 A | 2/2009 |
| JP | 4716528 | 7/2011 |
| WO | 2007139011 A1 | 12/2007 |

* cited by examiner

FIG. 3
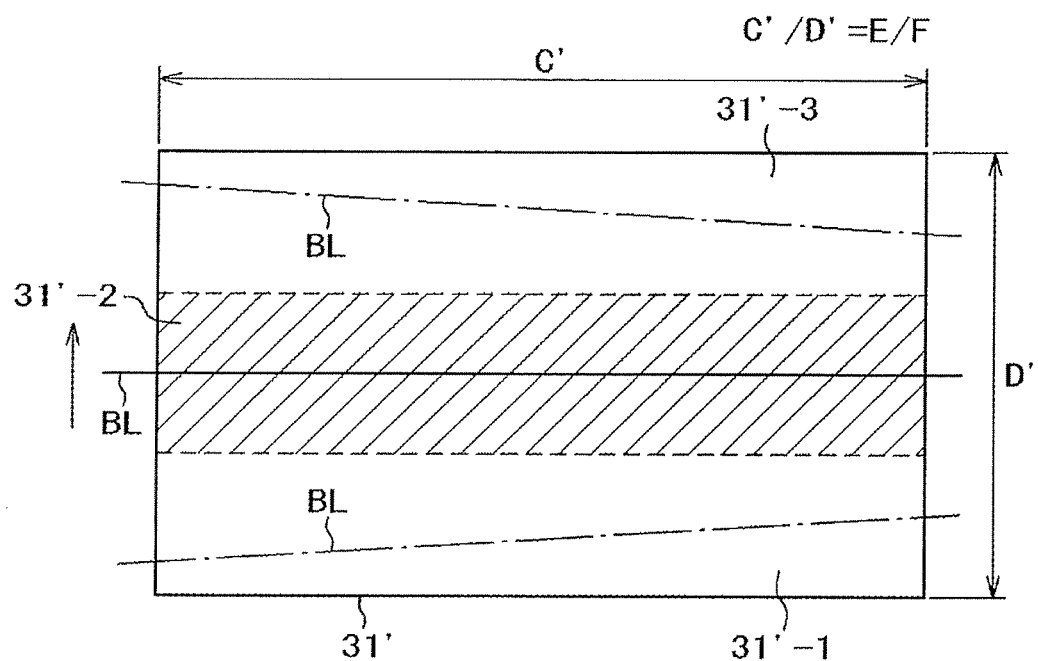
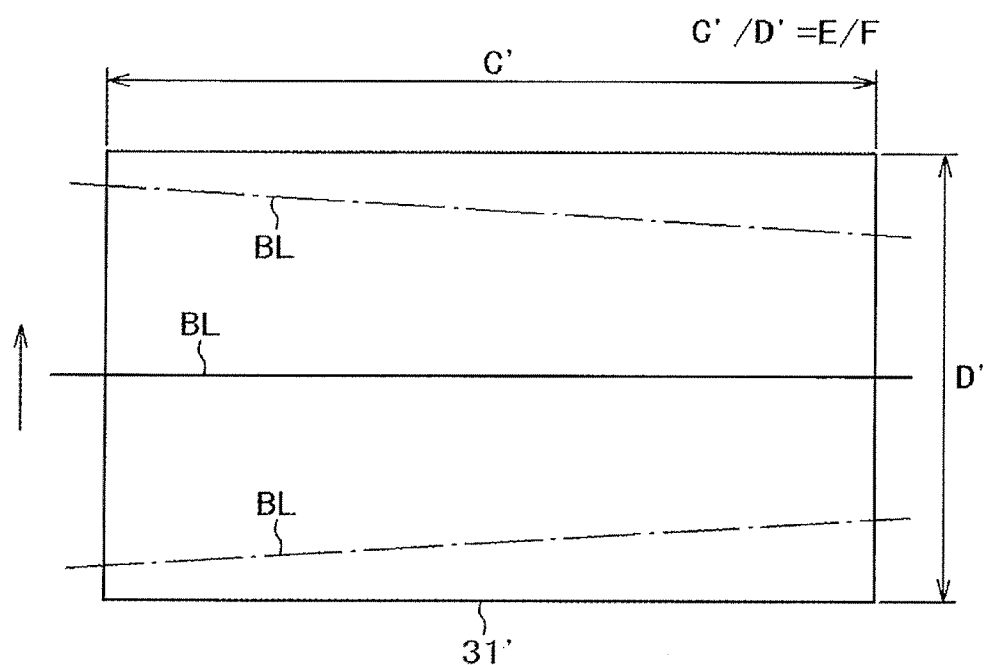

FIG. 4
(A)
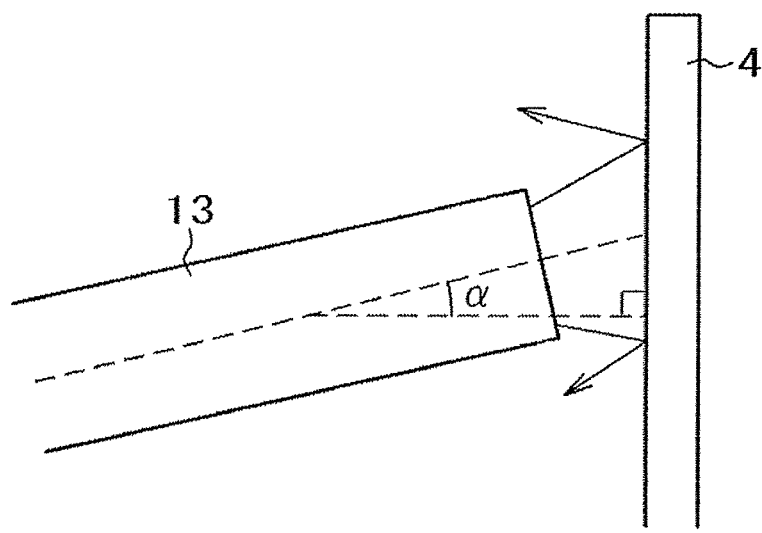
(B)
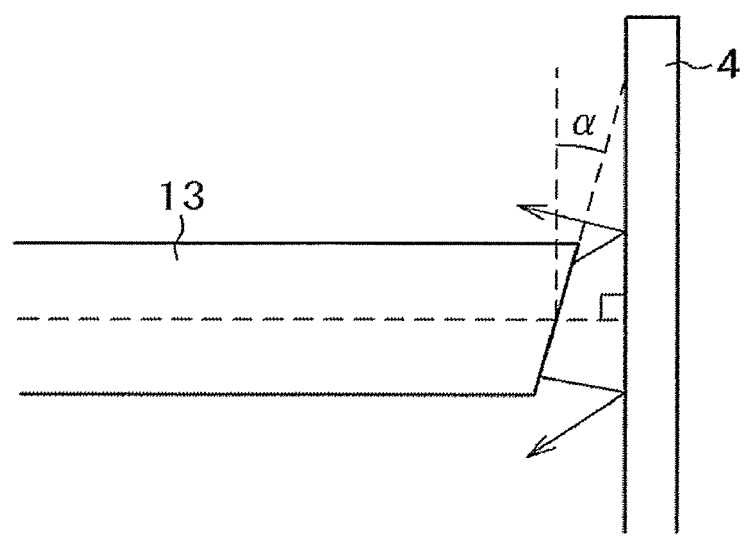

FIG. 5
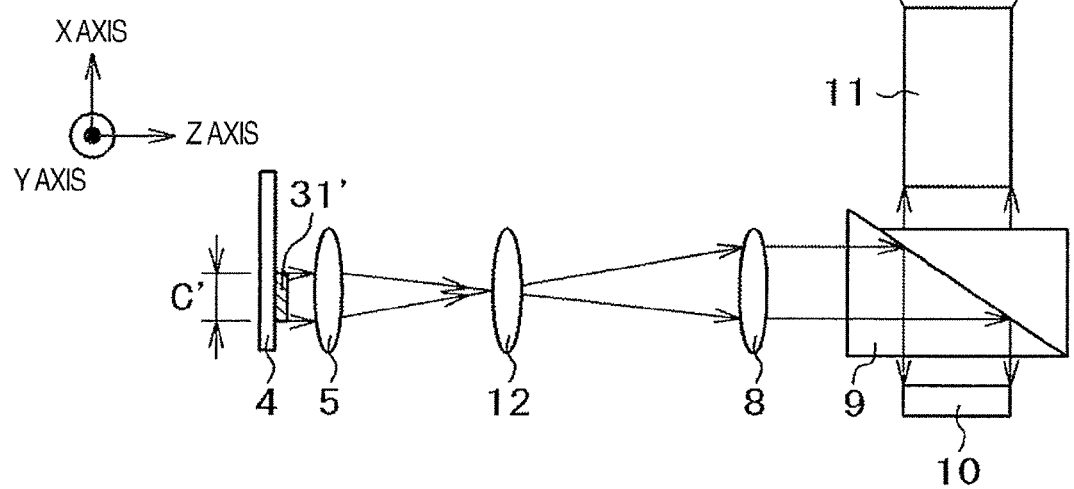
(A)
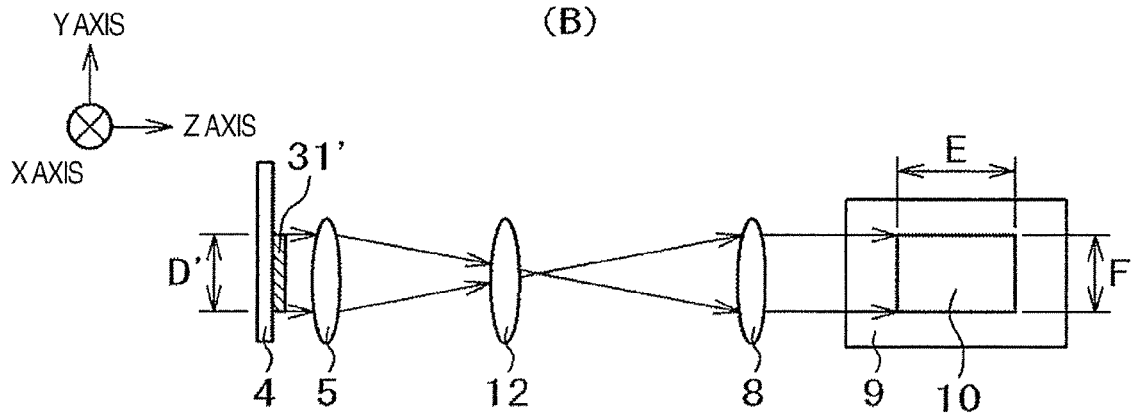
(B)

PROJECTION-TYPE VIDEO-IMAGE-DISPLAYING DEVICE

TECHNICAL FIELD

The present invention relates to a projection-type video-image-displaying device.

BACKGROUND ART

A projection-type video-image-displaying device which collects white light from a light source and forms a light-emitting surface, disposes a rotary color filter in the vicinity of the light-emitting surface, collects emitted light from the color filter and makes the light incident on one light modulation element, and projects an image formed by the light modulation element onto a screen by a projection lens, is already known by Patent Literature 1 described later. That is, since the same color image with high resolution as that of a three-plate type is obtained by one liquid crystal panel, it is unnecessary to provide fine color filters on pixels on each panel. Thereby, a yield of the liquid crystal panel can be improved and costs of the device can be reduced. Further, a control device which controls the rotation of the rotary color filter to be synchronized with an image display by the liquid crystal panel switches to an off state a state of the image display of the liquid crystal panel set by being divided into a plurality of lots in a rotation direction of the filter in synchronization with a passage of a boundary between respective color filters of the filter. Thereby, the control device prevents a color mixture from generating a state in which a collected-light spot (light-emitting surface) lies across adjacent color filters.

CITATION LIST

Patent Literature

Patent Literature 1: JP-B2-4716528

SUMMARY OF INVENTION

Technical Problem

However, in the projection-type video-image-displaying device disclosed in Patent Literature 1 described above, room to improve the rate (efficiency) of light contributing to the display of an original image is further left as described later.

To cope with the problems, in view of the above-described projection-type video-image-displaying device according to a conventional technology, it is an object of the present invention to further provide a projection-type video-image-displaying device capable of reducing the loss of light in the device, and thereby displaying the image more efficiently and reducing costs of the device.

Solution to Problem

To solve the above-described problems, according to the present invention, provided is a projection-type video-image-displaying device characterized by comprising a light source which radiates white light; a light-collecting optical element which collects light from the light source and emits the light; a rotary color filter which is disposed near an emitting surface of the light-collecting optical element and has a plurality of types of filters for selectively transmitting or reflecting light of a specific color in a predetermined order from white light which is emitted from the emitting surface of the light-collecting optical element; a light modulation element which has a plurality of pixels and which modulates incident light in accordance with an image signal and performs an image display; an illumination optical element which collects emitted light from the rotary color filter and forms illumination light for projecting the emitted light onto the light modulation element; a projection lens which projects an image formed by the light modulation element; and a control device which controls a rotation of the rotary color filter to be synchronized with an image display by the light modulation element, wherein the rotary color filter forms, on a part thereof, a light-emitting surface using light from the emitting surface of the light-collecting optical element, and the illumination optical element is disposed so as to have a substantially conjugate relationship with the light-emitting surface on the rotary color filter.

Advantageous Effects of Invention

According to the above-described present invention, the projection-type video-image-displaying device capable of reducing the loss of light in the device, and thereby displaying an image more efficiently and reducing costs of the device can be further provided.

BRIEF DESCRIPTION OF DRAWINGS

FIGS. 3(A) and 3(B) are views illustrating a principle for reducing the spoke time;

FIGS. 4(A) and 4(B) are views illustrating a principle for reducing reflection of infrared component light by the color wheel of the projection-type video-image-displaying device; and FIG. 5 is a view illustrating a design method of the illumination optical elements of the projection-type video-image-displaying device.

DESCRIPTION OF EMBODIMENTS

Figure 1:
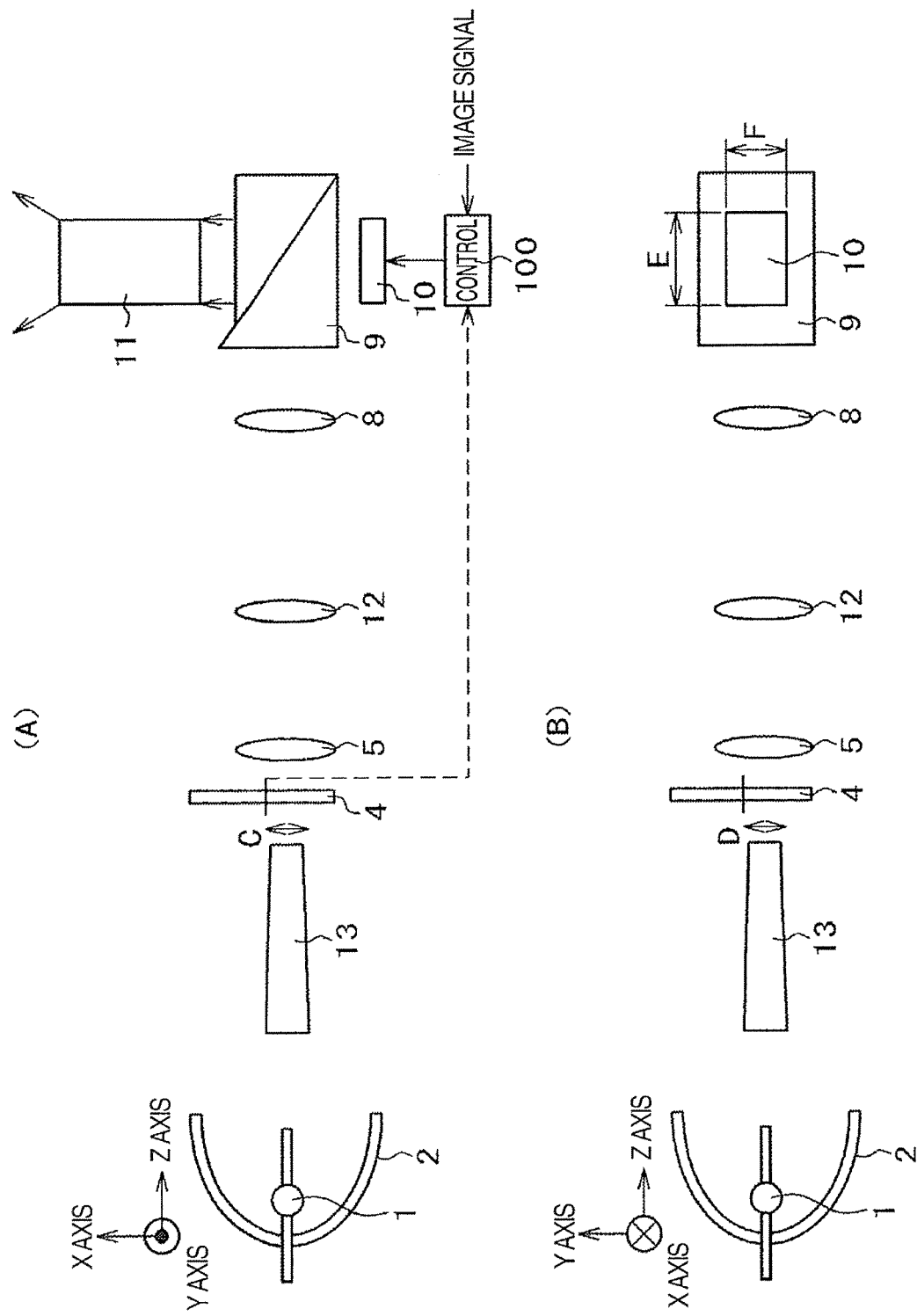
FIGS. 1 (A) and (B) are a top view and a side view illustrating one example of an essential part of a projection-type video-image-displaying device.

Hereinafter, one embodiment of the present invention will be described in detail with reference to the accompanying drawings. In each drawing to be described later, the same reference numerals are given to the same parts. Further, in the following descriptions, descriptions of portions described once will be omitted to avoid overlapping.

First, FIG. 1 are a top view (FIG. 1(A)) and a side view (FIG. 1(B)) illustrating one example of an essential part of a projection-type video-image-displaying device according to one embodiment of the present invention. Here, a local right-handed rectangular coordinate system is introduced into each figure. That is, in FIG. 1(A), a Z axis is used as a longitudinal direction of a light multiple reflecting element (rod lens), an X axis is used as an axis parallel to a page space in a surface perpendicular to the Z axis, and a Y axis is used as an axis toward a surface from a rear surface of the page space. Further, in FIG. 1(B), a Y axis is used as an axis parallel to the page space in the surface perpendicular to the Z axis, and an X axis is used as an axis toward a rear surface from a surface of the paper space. That is, FIG. 1(A) is a top view of the projection-type video-image-displaying device viewed from the Y-axial direction, and FIG. 1(B) is a side view of the projection-type video-image-displaying device viewed from the X-axial direction.

In these figures, a light source for radiating white light is configured by a discharge lamp 1 and a reflector 2. In addition, as the discharge lamp 1, for example, an extra-high-pressure mercury lamp or the like can be used. That is, the extra-high-pressure mercury lamp efficiently radiates white light; at the same time, luminance thereof is extremely high and radiated light thereof can be efficiently collected by a mirror surface being the reflector 2 that is excellent in light collecting property. More specifically, this reflector 2 is composed of an elliptic rotational surface in which an ellipse (however, a half circle) having a first focal point (short focal point) and a second focal point (long focal point) is rotated. On an internal surface thereof; a dielectric multilayer film which transmits infrared light and efficiently reflects visible light is formed and reflects a visible light component to the second focal point (long focal point) among light radiated from the discharge lamp 1 disposed at the first focal point (short focal point).

Further, behind the Z-axial direction of the above-described light source, a light multiple reflecting element (rod lens) 13 being a light-collecting optical element is disposed, and light emitted from the above discharge lamp 1 is captured and collected by the reflector 2 and is incident on the light multiple reflecting element (rod lens) 13. This light multiple reflecting element 13 is composed of, for example, a glass square pole or a hollow element in which four reflecting mirrors are bonded. An incident surface thereof (left end of the figure) is disposed in the vicinity of the second focal point (long focal point) of an ellipsoidal mirror 2 described above, namely, a position on which visible light components reflected by the reflector are collected, and an emitting surface thereof is a shape that is long in the X-axial direction and short in the Y-axial direction. Further, an aspect ratio thereof is set so as to be the same as that of a DMD 10 being a light modulation element to be described later. That is, when "C" is set as a length in the X-axial direction of the emitting surface, "D" is set as a length in the Y-axial direction thereof in the light multiple reflecting element 13, "E" is set as a length in the X-axial direction of the DMD 10, and "F" is set as a length in the Y-axial direction thereof, C/D=E/F is satisfied. Thereby, on the emitting surface, light reflected more than once in the light multiple reflecting element 13 forms a light distribution having even intensity and a similar figure with that of the DMD 10.

A color wheel 4 being a rotary color filter is disposed in the vicinity of the emitting surface of the light multiple reflecting element 13. This color wheel 4 is configured by disposing, in order in the circumferential (rotation) direction, six kinds of fan-shaped transmission type color filters which transmit only light of R (red), G (green), B (blue), C (cyan), Y (yellow), and W (white), respectively, and is a disk-like color filter capable of rotation control thereof. Further, in place of the six kinds of color filters, this color wheel 4 can be realized even by three kinds of color filters of R (red), G (green), and B (blue). However, it is preferred that the above-described color wheel 4 using the color filters of six colors is adopted in order to improve brightness.

By rotating the above-described color wheel 4, white light radiated from the light source is decomposed in time series into light of six colors (R (red), G (green), B (blue), C (cyan), Y (yellow), and W (white)). Thereafter, the light emitted from this color wheel 4 is radiated onto the DMD 10 through relay lenses 5, 12, and 8 and further a TIR prism 9 configuring illumination optical elements which collect the emitted light.

Here, functions of the relay lenses 5, 12, and 8 configuring the above illumination optical elements will be described. First, the relay lens 5 collects to the relay lens 12 the light which is emitted from the light multiple reflecting element (rod lens) 13 and is transmitted through the color wheel 4, and thereby has a function to prevent divergence of light. The relay lens 12 has a function to enlarge on a surface of the DMD 10 the light distribution which is even on the emitting surface of the color wheel 4. The relay lens 8 has a function to approximately collimated light from the above relay lens 12. Further, the TIR prism 9 totally reflects incident light, and thereby leads the light to the DMD 10.

Here, the DMD 10 is a reflection type light modulation element composed of a two-dimensional mirror array which can control individual slopes of micro mirrors, and two types of states of an on state and an off state are taken as respective slopes of the mirrors. When illumination light is radiated onto this DMD 10, the micro mirror in the on state reflects the illumination light toward a projection lens 11 (hereinafter, referred to as "on light"), and the micro mirror in the off-state reflects the illumination light toward the outside of the projection lens 11 (hereinafter, referred to as "off light"). That is, only the on light is magnified and projected onto a screen or the like, for example, via the projection lens 11.

Further, each of the micro mirrors of the DMD 10 corresponds to a minimum constituent element (pixel) of a projected image, and a pixel corresponding to the micro mirror in the on state is projected white and a pixel corresponding to the micro mirror in the off state is projected black. Further, by changing the time of the on-state, a projected video-image can be provided with gradation. That is, the time of the on state of each micro mirror is controlled, and thereby a video-image display is performed.

By a control device (configured by microcomputers and memories, for example) illustrated in the figure using a peripheral numeral of 100, this DMD 10 is synchronized with the rotation of the above-described color wheel 4. Thereby, the DMD 10 displays an image based on an image signal for light of each color of the color wheel 4, and at the same time, reflects light incident from the TIR prism 9 in the direction of the projection lens 11. That is, light after the reflection by the DMD 10 has an angle preventing from satisfying a total reflection angle of the TIR prism 9, and therefore the light is transmitted through the TIR prism 9 and is incident on the projection lens 11. Here, an optical system, in which after emitted from the color wheel 4, light is transmitted through the TIR prism 9 and reaches a surface of the DMD 10, is called an illumination optical system.

In the following, a relationship between the above-described color wheel 4 and spoke time of the DMD 10 will be described with reference to FIG. 2.

Figure 2:
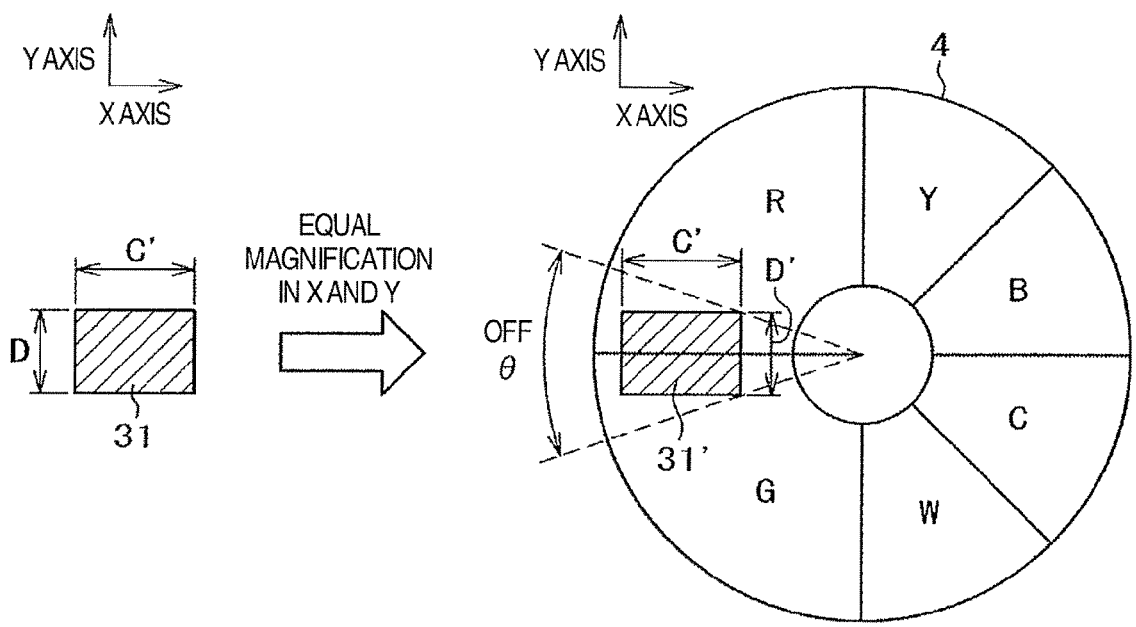
FIG. 2 is a view illustrating a relationship between a color wheel and spoke time in a DMD in the projection-type video-image-displaying device.

FIG. 2 is a view illustrating a light distribution 31 on the emitting surface of the light multiple reflecting element (rod lens) 13 and the light distribution 31 on a surface of the color wheel 4. That is, in the light distribution 31 on the emitting surface of the light multiple reflecting element (rod lens) 13, the X axial direction=C and the Y axial direction=D are satisfied. Further, the light distribution 31 is projected at the equal magnification onto the surface of the color wheel 4 to thereby obtain a light distribution 31', and the X axial direction=C' and the Y axial direction=D' (C'/D'=C/D) are satisfied. In other words, a shape of the emitting surface of the light multiple reflecting element 13 is directly projected onto the surface of the color wheel 4 disposed in the vicinity of the light multiple reflecting element 13, and has a similar figure.

On the other hand, in a boundary between respective color filters of the color wheel 4 (in FIG. 2, only a boundary between R and G is illustrated as one example), the above-described light distribution 31' is projected across the boundary and the light is interrupted to avoid a color mixture (specifically, the DMD 10 is set as the off state). This interrupted time is referred to as the spoke time; further, the emitted light is lost at the spoke time and it is necessary to minimize the spoke time.

To reduce the spoke time, for example, as illustrated also in FIG. 3(A), the light distribution 31' on the surface of the color wheel 4 of light emitted from the light multiple reflecting element (rod lens) 13 is divided into a plurality of rectangular areas (in this example, three areas 31'-1, 31'-2, and 31'-3) in a moving direction of the boundary BL between respective color filters of the rotated wheel 4 (in the example of the figure, the boundary BL moves upward as illustrated by an arrow). Further, the micro mirrors of the DMD 10 corresponding to these areas are set as the off state (in this example, the area 31'-2 is set as the off state). At the same time, in the other areas, the minimum constituent element (pixel) of the projected image is controlled to be set as the on or off state in accordance with light of respective colors. Since the boundary BL rotates (moves), when the boundary BL (dashed line) exists in the area 31'-1, all pixels in the area 31'-1 are set as the off state, and at the same time, pixels in the other areas 31'-2 and 31'-3 are controlled to be set as the on or off state in accordance with the projected image. Further, when the boundary (dashed line) exists in the area 31'-3, all pixels in the area 31'-3 are set as the off state, and at the same time, pixels in the other areas 31'-1 and 31'-2 are controlled to be set as the on or off state in accordance with the projected image. Thereby, the spoke time can be reduced and the loss of light due to the spoke time can be reduced.

In addition, in the above, a case in which the light distribution 31' on the surface of the color wheel 4 is divided into three areas is described. Further, it is apparent from a person skilled in the art that by dividing the light distribution 31' into more areas, the spoke time can be further reduced and the loss of light due to the spoke time can be reduced. Further, as illustrated also in FIG. 3(B), when the micro mirrors of the DMD 10 are set as the off state in accordance with a movement of the boundary BL between the color filters, the spoke time can be minimized. At this time, pixels in the areas which are divided into upper and lower parts across the micro mirrors set as the off state (disposed in line) on the DMD 10 are controlled to be set as the on or off state in accordance with the projected image. In addition, the above-described operations for reducing the spoke time in the DMD 10 are performed on the basis of software previously stored in memories by using the above-described control device 100.

In the following, a structure for reducing the loss of light in the above-described projection-type video-image-displaying device will be further described.

FIG. 4 attached illustrates a structure in which a part of light emitted from the light multiple reflecting element (rod lens) 13 is prevented from being reflected by the surface of the color wheel 4. Here, as described above, a lamp which radiates white light with high efficiency, such as an extra-high-pressure mercury lamp is generally adopted as the discharge lamp 1. However, when a part of light emitted from the light multiple reflecting element (rod lens) 13, particularly infrared component light is reflected by the color wheel 4, the reflected light is returned to the inside of the light multiple reflecting element (rod lens) 13 again, propagated through the inside thereof and reaches the discharge lamp 1, raises a temperature of the discharge lamp 1, and shortens the lifetime of the lamp.

To cope with a problem, to reduce the reflection of the infrared component light by the above color wheel 4, as illustrated in FIG. 4(A), a projection angle of light onto the surface of the color wheel 4 from the light multiple reflecting element (rod lens) 13 is inclined by a slight angle ($\alpha$) from verticality. Thereby, reflected light by the color wheel 4 is prevented from being returned to the inside of the light multiple reflecting element (rod lens) 13 again.

Alternatively, as illustrated also in FIG. 4(B), an exit port of the light multiple reflecting element (rod lens) 13 is inclined with respect to the surface of the color wheel 4 by the slight angle ($\alpha$). Also by this, in the same manner as in the above example, the reflected light by the color wheel 4 is prevented from being returned to the inside of the light multiple reflecting element (rod lens) 13 again. Thereby, the increase of the temperature of the discharge lamp 1 is prevented and a longer operating life of the lamp is realized. As a result of various experiments, it is confirmed that the above-described inclination angle ($\alpha$) is set to 1 to 10 degrees and thereby a required effect is obtained. Further, reduction in the use efficiency of light due to the leakage of light to the outside is also considered, and particularly, it is understood that the inclination angle is preferably set to 1 to 3 degrees.

In the following, illumination optical elements configuring an optical system in which after emitted from the color wheel 4, light is transmitted through the TIR prism 9 and reaches a surface of the DMD 10, namely, an illumination optical system will be described in detail below together with a design method including an arrangement relationship thereof. In the present example, as described above, the illumination optical elements are configured by including a plurality of the relay lenses 5, 12, and 8.

Here, for the purpose of understanding the present invention, problematical points in the conventional technology will be first described. That is, in the projection-type video-image-displaying device according to the conventional technology, the spatial modulation element (in the present example, corresponding to the DMD 10) is disposed so as to have a substantially conjugate relationship with the light-emitting surface. Between the spatial modulation elements, the illumination optical elements which collect the emitted light from the rotary color filter and radiate the light onto the spatial modulation element are provided. In addition, this light-emitting surface is an emitting surface opposite to the incidence of light in the glass rod configuring the above spatial modulation element.

However, according to an investigation of the inventors of the present invention, when the design method relating to the projection-type video-image-displaying device is adopted, light emitted from the emitting surface of the glass rod configuring the spatial modulation elements is projected onto the rotary color filter (in the present example, the color wheel 4) disposed in the vicinity thereof, and as a result forms the light-emitting surface on a surface opposite to the incident surface of the rotary color filter. Therefore, when the emitting surface of the glass rod and the rotary color filter are disposed extremely close to each other, the emitting surface of the glass rod is matched with the light-emitting surface formed on a surface opposite to the incident surface of the rotary color filter.

However, when a contact between the emitting surface of the glass rod and the rotary color filter is taken into consideration, it is necessary to provide a certain amount of gap 265 therebetween. In such a case, as described above, the light-emitting surface (namely, the emitting surface) of the glass rod is not matched with the light-emitting surface of the rotary color filter. Particularly, as described above, to further reduce the return of the infrared component light reflected by the color wheel 4 to the discharge lamp 1, supposing that the exit port of the light multiple reflecting element (rod lens) 13 is inclined with respect to the surface of the color wheel 4 by the slight angle ($\alpha$) (see FIG. 4(A)), or the exit port of the light multiple reflecting element (rod lens) 13 is inclined with respect to the surface of the color wheel 4 by the slight angle ($\alpha$) (see FIG. 4(B)). In this case, the exit port (namely, the light-emitting surface) of the light multiple reflecting element (rod lens) 13 and the light-emitting surface on the surface of the color wheel 4 are slightly changed also in sizes and shapes thereof. However, through this slight change, an enlarged image on the light-emitting surface projected onto the DMD 10 being the spatial modulation element by the illumination optical elements therebehind (namely, including the plurality of the relay lenses 5, 12, 8 and the TIR prism 9) is not matched with an effective light modulation surface of the DMD 10 (namely, a maximum surface in which a light modulation can be performed thereon), and as a result, reduction in the use efficiency of light is incurred.

Then, the design method of the illumination optical elements of the projection-type video-image-displaying device according to the present invention will be described in detail below with reference to FIG. 5.

As described above, the light that is radiated from the light source including the discharge lamp 1, transmitted through the light multiple reflecting element (rod lens) 13, and emitted from the exit port thereof is projected onto the color wheel 4 and forms the light-emitting surface 31' (the X axial direction=C' and the Y axial direction=D' (C'/D'=C/D)) on a surface opposite to the incident surface. Further, on the basis of the light-emitting surface 31' on the color wheel 4, the plurality of the relay lenses 5, 12, and 8 being the illumination optical elements are designed. That is, the DMD 10 is disposed so as to have a substantially conjugate relationship with the light-emitting surface 31' on the color wheel 4. In other words, a relationship of C'/D'=E/F is satisfied for the effective light modulation surface (the Y axial direction=F and the Z axial direction=E) of the DMD 10.

According to the above-described design method, the light-emitting surface 31' on the color wheel 4 can be certainly matched with the effective light modulation surface on the DMD 10, and the use efficiency of light in the projection-type video-image-displaying device can be further improved. Further, also when a structure is adopted in which the reflection of the infrared component light by the color wheel 4 illustrated in FIGS. 4(A) and 4(B) described above is reduced, the use efficiency of light can be further improved.

In the projection-type video-image-displaying device described in detail above according to the embodiment of the present invention, as one example of the light modulation elements for forming a desired image through light of each color from the color wheel 4, a configuration is described in which the DMD including two-dimensional mirror array capable of controlling individual slopes of the micro mirrors and being the so-called reflection type light modulation element is adopted, however, the present invention is not limited thereto. In place thereof, for example, a liquid crystal panel being a ferroelectric liquid crystal panel and being a bistable element which switches two states of ON/OFF can be used. In such a case, the TIR prism 9 configuring a part of the illumination optical system is unnecessary. In addition, in the above-described projection-type video-image-displaying device, as the color wheel 4 being the rotary color filter, the one configured by a plurality of transmission type color filters is described, however, the present invention is not limited thereto. In place thereof, for example, reflection type color filters can be used.

In addition, the present invention is not limited to the above-described embodiments, but includes various modifications. For example, the above-described embodiments are described in detail in order to clearly describe the present invention, and are not necessarily limited to the device having all the described constructions. Further, a part of constructions according to one embodiment can be replaced by those according to other embodiment, and the constructions according to other embodiment can be added to that according to one embodiment. Further, an addition, deletion, or replacement of the constructions according to other embodiment can be performed by using a part of the constructions according to each embodiment.

REFERENCE SIGNS LIST

1 Discharge lamp
2 Reflector
4 Color wheel
5, 8, 12 Relay lens
9 TIR prism
10 DMD
11 Projection lens
13 Light multiple reflecting element (Rod lens)
100 Control device
31' Light-emitting surface

The invention claimed is:
1. A projection-type video-image-displaying device comprising:
   a light source which radiates white light;
   a light-collecting optical element which collects light from the light source and emits the light;
   a rotary color filter which is disposed near an emitting surface of the light-collecting optical element and has a plurality of types of filters for selectively transmitting or reflecting light of a specific color in a predetermined order from white light which is emitted from the emitting surface of the light-collecting optical element;
   a light modulation element which has a plurality of pixels and which modulates incident light in accordance with an image signal and performs an image display;
   an illumination optical element which collects emitted light from the rotary color filter and forms illumination light for projecting the emitted light onto the light modulation element;
   a projection lens which projects an image formed by the light modulation element; and
   a control device which controls a rotation of the rotary color filter to synchronize with the image display by the light modulation element, wherein
   the rotary color filter forms, on a part thereof, a light-emitting surface using light from the emitting surface of the light-collecting optical element, the optical axis of light-collecting optical element is disposed at incli- nation angle in a range of 1 to 10 degrees with respect to a vertical line from a surface of the rotary color filter, and the illumination optical element is disposed so as to have a substantially conjugate relationship with the light-emitting surface on the rotary color filter.

2. The projection-type video-image-displaying device as claimed in claim 1, characterized in that the light-collecting optical element has a configuration in which a part of emitted light from the light-collecting optical element is hardly reflected and returned by the rotary color filter.

3. The projection-type video-image-displaying device as claimed in claim 1, characterized in that the slight inclination angle is set in a range of 1 to 3 degrees.

4. The projection-type video-image-displaying device as claimed in claim 2, characterized in that the control device controls a part of a plurality of pixels of the light modulation element to respond to a position of a boundary between respective color filters of the rotary color filter moving on the light-emitting surface, and thereby reduces a color mixture between the respective color filters.

5. A projection-type video-image-displaying device comprising:
   a light source which radiates white light;
   a light-collecting optical element which collects light from the light source and emits the light;
   a rotary color filter which is disposed near an emitting surface of the light-collecting optical element and has a plurality of types of filters for selectively transmitting or reflecting light of a specific color in a predetermined order from white light which is emitted from the emitting surface of the light-collecting optical element;
   a light modulation element which has a plurality of pixels and which modulates incident light in accordance with an image signal and performs an image display;
   an illumination optical element which collects emitted light from the rotary color filter and forms illumination light for projecting the emitted light onto the light modulation element;
   a projection lens which projects an image formed by the light modulation element; and
   a control device which controls a rotation of the rotary color filter to synchronize with the image display by the light modulation element, wherein
   the rotary color filter forms, on a part thereof, a light-emitting surface using light from the emitting surface of the light-collecting optical element, and
   the illumination optical element is disposed so as to have a substantially conjugate relationship with the light-emitting surface on the rotary color filter; whereby the emitting surface of the light-collecting optical element is disposed so as to be slightly inclined at an angle with respect to a surface of the rotary color filter, and the slight inclination angle is set in a range of 1 to 10 degrees.

* * * * *